US006920806B2

(12) United States Patent
Cutsforth

(10) Patent No.: US 6,920,806 B2
(45) Date of Patent: Jul. 26, 2005

(54) HANDLEBAR MOUNTING APPARATUS

(75) Inventor: Rockford F. Cutsforth, Cohasset, MN (US)

(73) Assignee: Cutsforth Products, Inc., Cohasset, MN (US)

( * ) Notice: Subject to any disclaimer, the term of this patent is extended or adjusted under 35 U.S.C. 154(b) by 0 days.

(21) Appl. No.: 10/007,475

(22) Filed: Nov. 7, 2001

(65) Prior Publication Data

US 2003/0084746 A1 May 8, 2003

(51) Int. Cl.⁷ .............................................. B62K 21/12
(52) U.S. Cl. ................... 74/551.8; 74/551.8; 74/551.1; 74/551.3
(58) Field of Search ........................ 94/551.8; 74/551.8, 74/551.3, 551.1; 403/256, 257, 258, 259, 260, 261

(56) References Cited

U.S. PATENT DOCUMENTS

| | | | | |
|---|---|---|---|---|
| 4,032,168 | A | | 6/1977 | Emerson |
| 4,043,688 | A | | 8/1977 | Humlong |
| 4,930,798 | A | * | 6/1990 | Yamazaki et al. .......... 280/261 |
| 5,226,341 | A | * | 7/1993 | Shores ....................... 74/551.8 |
| 5,319,995 | A | * | 6/1994 | Huang ....................... 74/551.8 |
| 5,353,663 | A | * | 10/1994 | Samuelson ................ 74/551.8 |
| 5,570,614 | A | * | 11/1996 | Nastrucci .................. 74/551.1 |
| 5,737,967 | A | * | 4/1998 | Hartley ...................... 74/551.3 |
| 5,829,316 | A | | 11/1998 | Krizman, Jr. |
| 5,842,385 | A | | 12/1998 | Su |
| 5,983,747 | A | * | 11/1999 | Chen ......................... 74/551.9 |
| 6,003,405 | A | | 12/1999 | Giard |
| 6,035,741 | A | | 3/2000 | Krizman, Jr. |
| 6,122,991 | A | | 9/2000 | Clarkson |
| 6,244,131 | B1 | * | 6/2001 | Liao ........................... 74/551.3 |
| 6,467,372 | B2 | * | 10/2002 | Klieber ...................... 74/551.1 |

FOREIGN PATENT DOCUMENTS

| | | | | |
|---|---|---|---|---|
| DE | 4336485 A1 | * | 6/1994 | ........... B62K/21/26 |
| DE | 4445204 A1 | * | 6/1996 | ........... B62K/21/16 |
| GB | 2293800 A | * | 4/1996 | ........... B62K/21/12 |

OTHER PUBLICATIONS

Article entitled "Inside Line/Thumper Racing/Handlebar Risers", *Dirt Rider*, Dec. 2000, p. 157.
Advertisement entitled "Weigh Your Options", date on or before Nov. 7, 2001, 1 page.
Advertisement from Hi–performance Engineering, *Snow-Tech*, Oct/Nov. 2000, p. 17.
Advertisement from Kinetic, *SnowTech*, Oct/Nov. 2000, p. 61.

* cited by examiner

*Primary Examiner*—David A. Bucci
*Assistant Examiner*—Bradley J. Van Pelt
(74) *Attorney, Agent, or Firm*—Crompton, Seager & Tufte, LLC.

(57) ABSTRACT

A handlebar mounting apparatus and method for mounting a handlebar onto a vehicle. The handlebar is mounted to the vehicle such that the handlebar is selectively rotatable about a first axis to allow for adjustment of the axial orientation of the handlebar relative to the vehicle. Additionally, the mounts are connected to the vehicle for selective, eccentric rotation of the mounts about a second axis to allow for selective height and position adjustment of the handlebar in relation to the vehicle. One embodiment provides an apparatus for mounting a handlebar to a vehicle including two or more mounts. The use of multiple mounts or mounting assemblies in such embodiments allows the mounts to be separated or spaced from one another, and allows for universal fit of the handlebar mounting apparatus on a broad variety of vehicles and applications.

5 Claims, 4 Drawing Sheets

HANDLEBAR MOUNTING APPARATUS

FIELD OF THE INVENTION

The invention relates generally to handlebars for vehicles. More particularly, the invention relates to an apparatus and method for mounting handlebars to a vehicle.

BACKGROUND

It is generally known to use handlebars as a component of a steering mechanism for vehicles, for example, motorcycles, snowmobiles, ATV's, bicycles, tricycles, and other like vehicles. The prior art offers a number of different structures and mechanisms for mounting handlebars to vehicles. Each of these different structures and mechanisms have certain advantages and disadvantages. There is an ongoing need to provide design alternatives for mounting a handlebar to a vehicle.

SUMMARY OF EXAMPLE EMBODIMENTS OF THE INVENTION

To this end, the invention relates to mounting a handlebar to a vehicle.

For example, one embodiment provides an apparatus for mounting a handlebar to a vehicle including two mounts. Each mount includes a first portion and a second portion. The first portion is adapted and configured to be connected to the handlebar such that the handlebar is selectively rotatable about a first axis to allow for adjustment of the axial orientation of the handlebar relative to the vehicle. The second portion is adapted and configured to be connected to the vehicle for selective, eccentric rotation of the mounts about a second axis to allow for selective height and position adjustment of the handlebar in relation to the vehicle.

Another exemplary embodiment includes a vehicle including a handlebar and a handlebar mounting apparatus for mounting the handlebar to the vehicle, the handlebar mounting apparatus including two handlebar mounts. Each mount includes a riser member including a first portion and a second portion. Each mount also includes a handlebar connecting structure adapted and configured for selective connection of the handlebar to the first portion of the riser member and allow for selective rotation of the handlebar about a first axis for adjustment of the orientation of the handlebar in relation to the vehicle. Each mount also includes a vehicle connecting structure adapted and configured for selective connection of the riser member to the vehicle and allow for selective eccentric rotation of the riser member about a second axis to allow for height adjustment of the handlebar in relation to the vehicle.

Another exemplary embodiment provides a method for mounting a handlebar to a vehicle. The method includes providing two or more mounts, and connecting the handlebar to a first portion of the mount which is adapted and configured to allow for selective rotation of the handlebar about a first axis for adjustment of the orientation of the handlebar in relation to the vehicle. The method also includes connecting a second portion of the mounts to a vehicle to allow for selective, eccentric rotation of the mounts about a second axis to allow for height and position adjustment of the handlebar in relation to the vehicle.

These and other embodiments of the invention will be described in more detail in the following detailed description with reference to the drawings.

DETAILED DESCRIPTION OF SOME EXAMPLE EMBODIMENTS

The following detailed description should be read with reference to the drawings in which similar elements and different drawings are numbered the same. The drawings, which are not necessarily to scale, depict illustrative embodiments that are not intended to limit the scope of the invention.

Those skilled in the art and others will recognize that the invention can be manifested in a variety of forms other than the specific embodiments described and contemplated herein. Accordingly, departures in form and detail may be made without departing from the scope and spirit of the invention as described in the appended claims.

Figure 1:
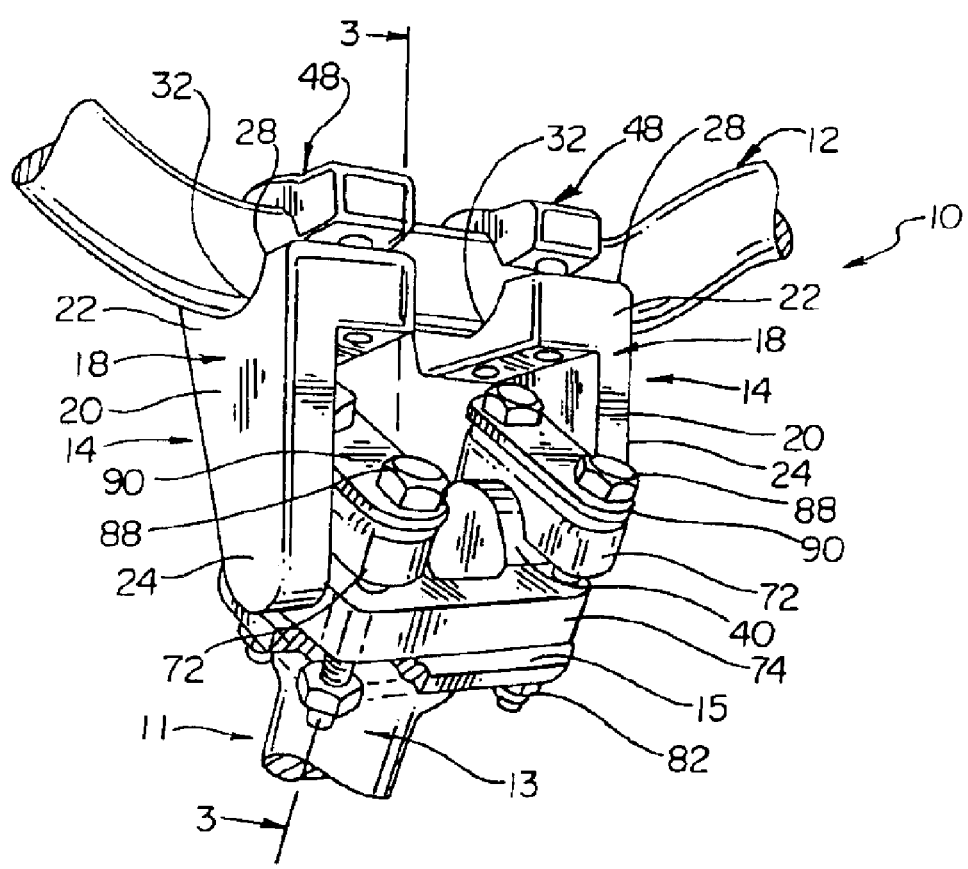
FIG. 1 is a partial perspective view of a handlebar mounting apparatus in accordance with one exemplary embodiment of the invention.
Figure 2:
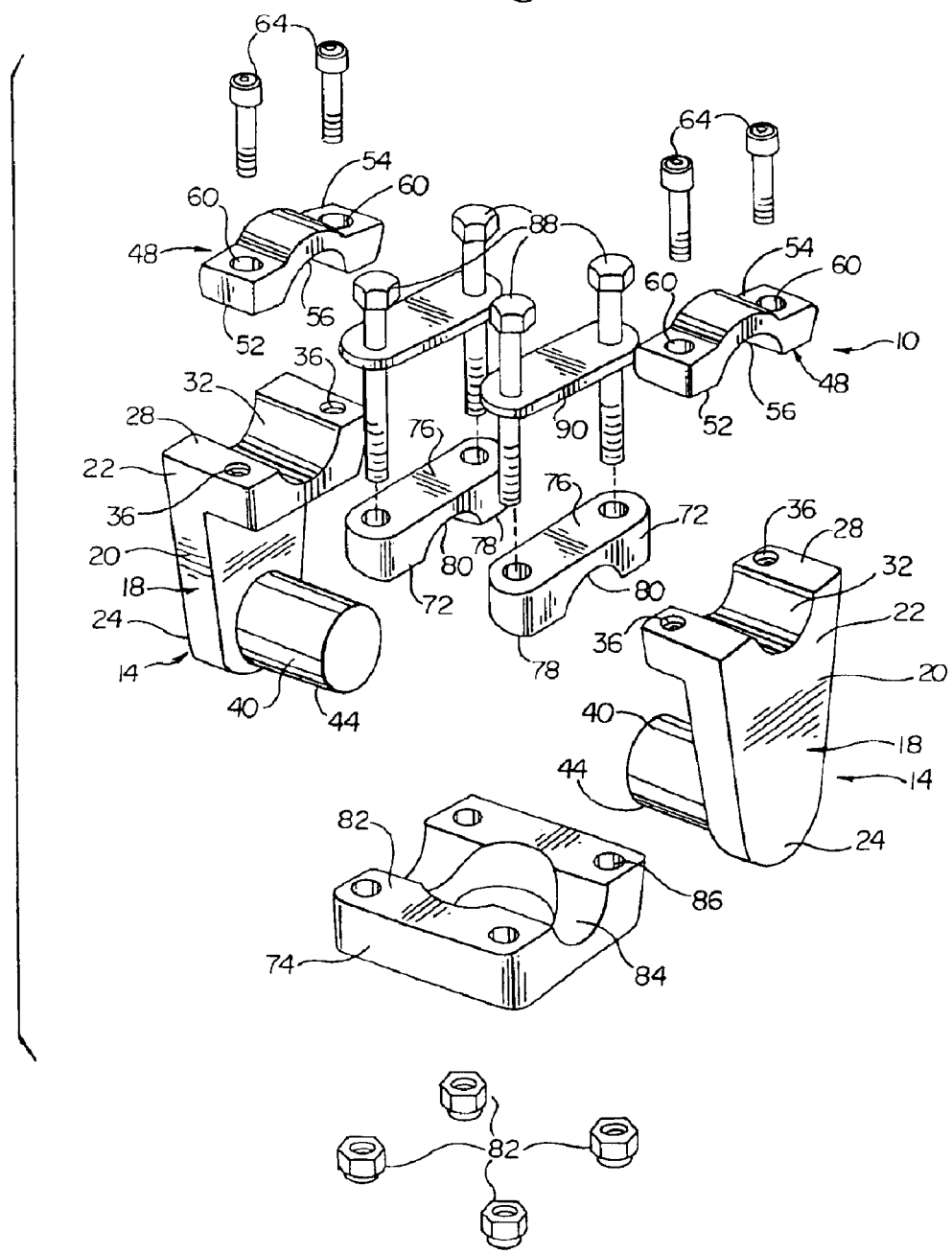
FIG. 2 is a partial exploded perspective view of the handlebar mounting apparatus of FIG. 1.
Figure 3:
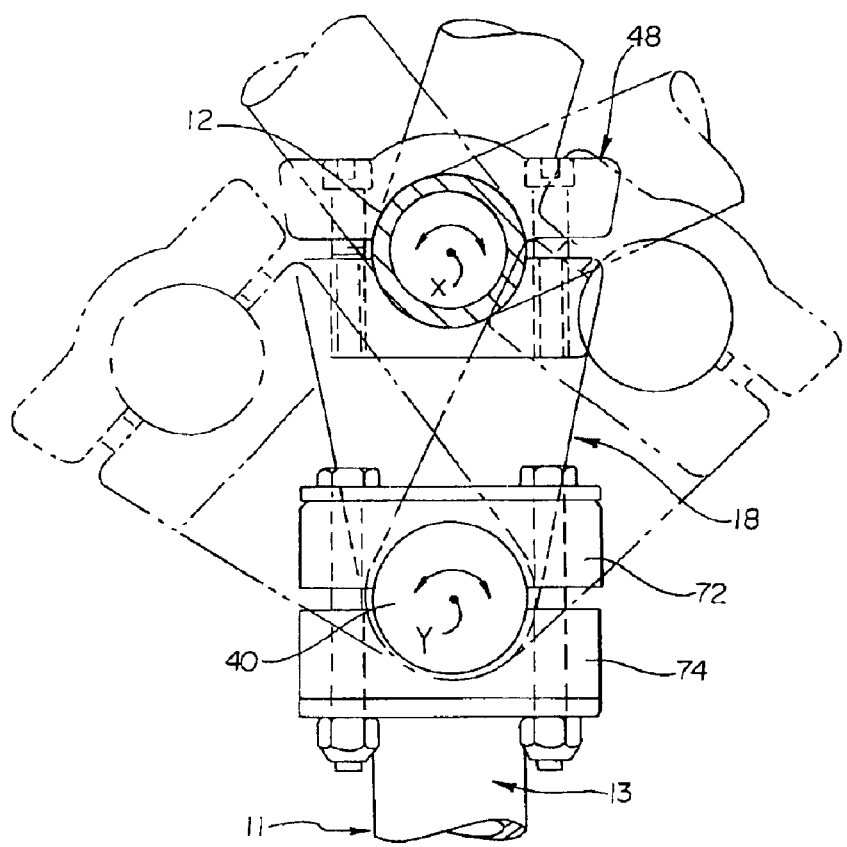
FIG. 3 is a partial cross-sectional view of the handlebar apparatus of FIG. 1 taken along lines 3—3 of FIG. 1, showing selective movement of the handlebar and mounting apparatus in phantom.

FIGS. 1–3 show one exemplary embodiment of a handlebar mounting apparatus 10 as adapted and configured for mounting a handlebar 12 to a steering structure 13 of a vehicle 11. Referring to FIGS. 1 and 2, the apparatus 10 includes a pair of mounts, or mount assemblies 14. The mounts 14 are adapted and configured to be connected to a handlebar 12 such that the handlebar is selectively rotatable within the mounts to allow for selective orientation of the handlebar relative to the vehicle. In this embodiment, each mount 14 includes a riser member 18 having a body 20. Each riser member 18 includes an upper portion 22 and a lower portion 24. The upper portion 22 includes an upper surface 28. The upper surface 28 is preferably adapted and configured to mate with a portion of the handlebar 12 as will be discussed in more detail below. In the embodiments shown, the surface 28 preferably defines a semi-circular groove 32 for mating with a portion of the handlebar 12.

The lower portion 24 includes a projection 40 thereon. Preferably, the projection 40 is generally cylindrical in shape. However, those of skill in the art will recognize that other shapes can be used. Preferably, the projection 40 extends generally perpendicular from the body 20 of the riser 18, but it is contemplated that in other embodiments, the projection may extend away from the body 20 at angles other than right angles.

The mounts 14 each also include structure to couple the riser 18 to the handlebar 12. Such structure preferably includes any structure that allows the handlebar 12 to be coupled to the riser 18 while allowing for selective rotation of the handlebar 12 about a first axis to allow for adjustment of the axial orientation of the handlebar 12 relative to the vehicle. Those of skill in the art will be able to contemplate a variety of structures that can achieve this desired result. In the embodiment shown, the handlebar connecting structure includes a clamping structure 48 adapted and configured to engage the handlebar 12 and couple to the upper portion 22 of the riser 18. Referring to FIG. 2, the clamping structure 48 includes a lower surface 52 and upper surface 54. The lower surface 52 defines a semi-circular groove 56 which is adapted and configured to mate with the handlebar 12. The upper surface 54 includes a pair of apertures 60 which extend through the clamping structure. A pair of threaded bolts 64 are provided which are adapted to extend through aperture 60 and engage with threaded aperture 36 in the upper surface 28 of the riser 18.

As shown in FIG. 1, the handlebar 12 is coupled to the riser members 18 by placing the handlebar 12 in the semi-circular grooves 32 formed in the upper surface 28 of the risers 18, and placing the upper clamping structures 48 such that the semi-circular grooves 56 engages the handlebar 12. Threaded bolts 64 are then inserted through apertures 60 and tightened into threaded apertures 36 to couple the handlebar 12 to the risers 18. Referring to FIG. 3, which shows the selective rotation of the handlebar about axis X, the handlebar 12 can selectively be maintained in a fixed position relative to the risers 18, or, can selectively be rotated about a first axis X by the loosening of the threaded bolts 64 to allow for rotation of the handlebar about axis X. In such a manner, the handlebar is selectively rotatable about the axis X for adjustment of the axial orientation of the handlebar relative to the vehicle.

The mounts 14 also each include structure that is adapted and configured to couple the mounts 14 to the vehicle for selective, eccentric rotation of the mounts 14 about a second axis to allow for selective height and position adjustment of the handlebar 12 in relation to the vehicle. Those of skill in the art will be able to contemplate a variety of structures to achieve this desired result. Referring to FIGS. 1 and 2, in the embodiments shown, such structure can include a lower clamping structure including clamp members 72 which are adapted and configured to mate with a portion of the steering structure 13, for example a vehicle handlebar mounting plate 74, of the vehicle 11. The clamp members 72 each include an upper surface 76 and a lower surface 78, the lower surface defines a semi-circular groove 80 which is adapted and configured to mate with the outer surface 44 of the projection 40. The mounting plate 74 of the vehicle typically includes an upper surface 82 which is often adapted and configured to mate with a handlebar to connect the handlebar to the vehicle. In this embodiment, the upper surface of the mounting plate 74 on the vehicle defines a semi-circular groove 84 therein. The outer surface 44 of the projection 40 on the riser is adapted and configured to mate with the semi-circular groove 84 in the vehicle handlebar mounting plate 74. The mounting plate 74 also includes a plurality of openings 86 extending therethrough. Referring to FIG. 1, the clamping member 72 and the mounting plate 74 are adapted and configured to clamp the projection 40 therebetween. A series of bolts 88 extend through washers 90 and then through clamp members 72 and mounting plate 74. The bolts 88 also extend through an upper surface 15 of a vehicle steering structure 13. Nuts 82 engage the threaded portion of the bolts 88 to maintain the entire structure onto the upper portion of the vehicle steering structure 13.

Referring to FIG. 3, which shows the selective movement of the mounts 14 about axis Y, the mounts 14 are connected to the vehicle and can selectively be maintained in a fixed position relative to the vehicle, or can be selectively rotated in an eccentric manner about axis Y by the loosening of the nuts 82 on the bolts 88. The selective eccentric rotation of the mounts about a second axis Y provides for selective height and position adjustment of the handlebar in relation to the vehicle. As seen in FIG. 3, as the mounts 14 are rotated about axis Y, the handlebar can be adjusted in both a vertical and a horizontal manner.

The first and second mounts 14 are preferably spaced in relation to one another when connected to the vehicle steering structure 13 and handlebar 12. In this embodiment, the fact that there are two mounts 14 allows for adaptation of the handlebar mounting apparatus 10 to a broad variety of vehicles. For example, many vehicles may have different vehicle steering structures that may or may not be the same size across a broad range of vehicles. The use of multiple mounts or mounting assemblies allows such mounting assemblies to be separated or spaced from one another. Therefore, the spacing of the mounts can be varied to offer fit of the apparatus on different sized vehicles. Such universal fit allows for the use of the handlebar mounting apparatus 10 in a broad variety of vehicles and applications.

In the embodiment shown in FIGS. 1–3, the mounts 14 can be spaced in relation to one another when connected to a vehicle, and this spacing can be varied to adapt to different sized vehicles. For example, in the embodiment shown, the mounts can be adapted for use on a vehicle with a different sized or configured mounting plate 74.

Figure 4:
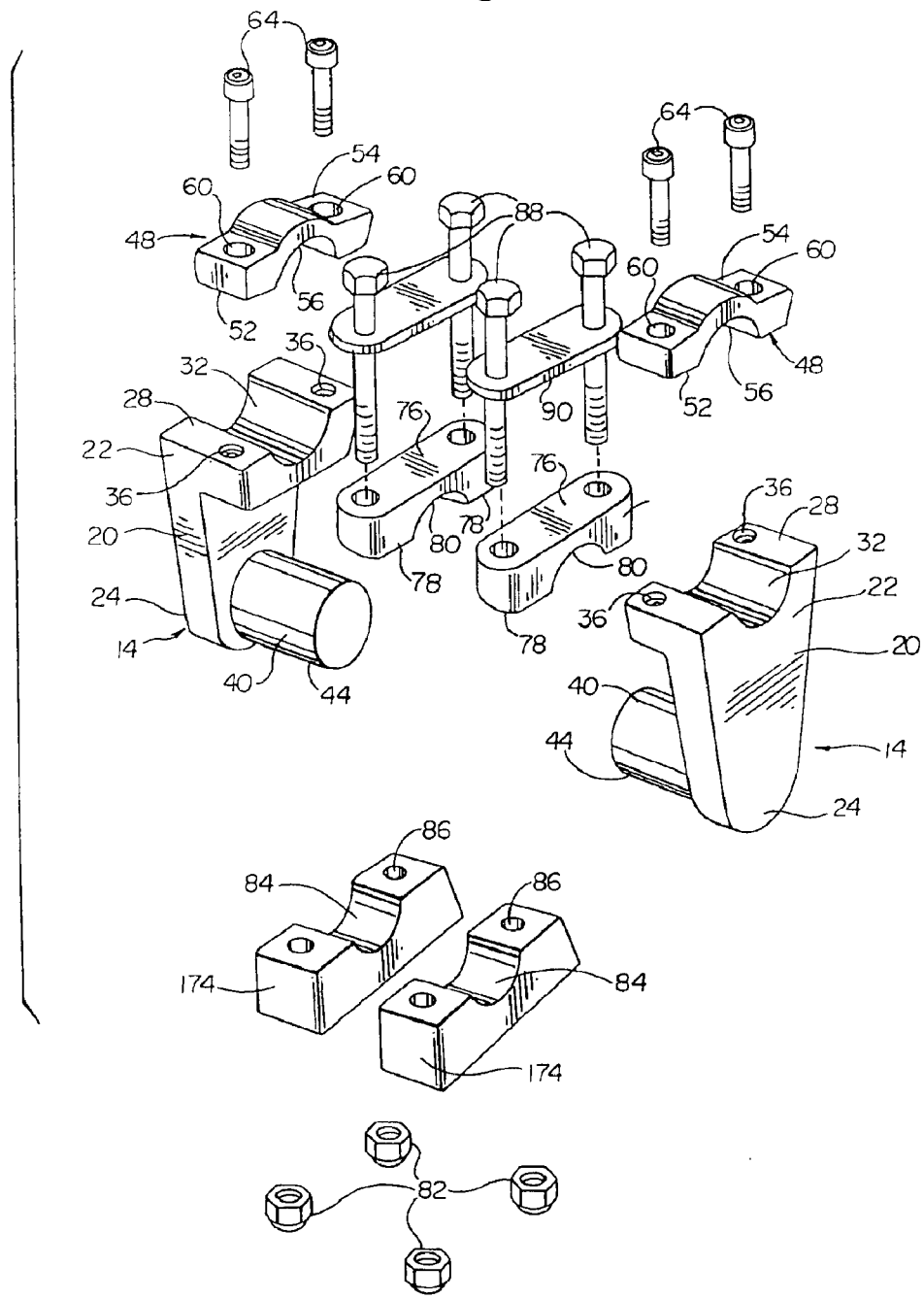
FIG. 4 is a partial exploded view of another exemplary embodiment of a handlebar mounting apparatus.

Another example embodiment is shown in FIG. 4. FIG. 4 shows the handlebar mounting apparatus substantially similar to that shown in FIG. 1, wherein like reference numerals are used to indicate like structures. The only difference in the embodiment shown in FIG. 4 is that instead of the vehicle including a singular mounting plate 74, a pair of mounting plates 174 are shown. The handlebar mounting assembly remains the same, and can be mounted to the vehicle including the pair of mounting plates 174.

As discussed above, the mounting plates 74 in FIGS. 1–3 and 174 in FIG. 4 are examples of typical structure found on steering assemblies of vehicles. Those of skill in the art and others will recognize that other steering structures exist, and that the handlebar mounting apparatus and method can be appropriately modified for use on these alternative structures. Additionally, it is contemplated that in some example embodiments, the handlebar mounting apparatus can include such mounting plates to be mounted onto the existing vehicle steering structure.

It should be understood to those of skill in the art and others will recognize that a broad variety of structures can be used to connect the handlebar to the upper portion of the risers for selective rotation about the first axis and allow for adjustment of the axial orientation handlebar relative to the vehicle. It should also be understood that those of skill in the art and others will contemplate additional structure that allow the lower portion of the mounts to be connected to the vehicle for selectively eccentric rotation of the mounts about the second axis to allow for selective height and position adjustment of the handlebar in relation to the vehicle. Such contemplated structures may be used without departing from the spirit and scope of the invention.

Having thus described the preferred embodiments of the invention, those of skill in the art will readily appreciate that other embodiments may be made and used within the scope of the claims hereto attached. It will be understood that this disclosure is, in many respects, only illustrative. Changes can be made in details, particularly in matters of shape, size and arrangement of parts without exceeding the scope of the invention. The invention's scope is, of course, defined in the language in which the appended claims are expressed.

What is claimed is:

1. An assembly configured for attaching to a vehicle, the vehicle including a steering structure including clamp members, the assembly comprising:
   a curved unitary handlebar; and
   a first and a second handlebar riser, each riser including:
      a riser body having a having a side surface;
      an upper handlebar connecting structure adapted and configured to selectively connect the curved unitary handlebar to the riser and allow for selective rotation of the handlebar about a first axis for adjustment of the orientation of the handlebar in relation to the vehicle; and a vehicle connecting structure including a projection of unitary construction with or permanently attached to the riser body, the projection extending from the side surface of the riser body, the projection sized and shaped to selectively connect the riser to the steering structure of the vehicle utilizing the clamp members of the steering structure, and allow for selective eccentric rotation of the riser about a second axis to allow for height and position adjustment of the handlebar in relation to the vehicle.

2. The assembly of claim 1, wherein the projection comprises a cylindrical projection extending perpendicularly from the side surface of each handlebar riser.

3. The assembly of claim 1, wherein the handlebar connecting structure of each handlebar riser comprises an upper surface of the handlebar riser including an indentation configured to accept the curved unitary handlebar and a separate upper clamp portion that is configured to be scoured to the upper surface of the handlebar riser, thereby securing the curved unitary handlebar.

4. The assembly of claim 3, wherein the handlebar connecting structure of each handlebar riser is configured to permit placement of the curved unitary handlebar atop the indentation of each upper surface, with the separate upper clamp portion of each handlebar riser subsequently secured to the handlebar riser.

5. A riser assembly for attaching a unitary handlebar to a vehicle, the handlebar having a generally cylindrical cross section defining a diameter, the vehicle including a steering structure including clamp members, the riser assembly comprising:

a first handlebar riser and a second handlebar riser, each of the two risers including:

a riser body having a length that is greater than the diameter of the handlebar and having an upper portion and a lower portion and a side surface;

an upper handlebar connecting structure disposed at the upper portion of the riser body, the upper handlebar connecting structure including an upper surface of the riser body including an indentation configured to accept a portion of the unitary handlebar, and a separate upper clamp portion that is configured to be secured to the upper surface of the handlebar riser, thereby selectively securing the unitary handlebar to the riser body for selective rotation of the handlebar about a first axis for adjustment of an orientation of the handlebar in relation to the vehicle;

a vehicle connecting structure disposed at the lower portion of the riser body and spaced from the upper handlebar connecting structure by a distance greater than the diameter of the handlebar, the vehicle connecting structure including a cylindrical projection of unitary construction with or permanently attached to the rinser body, the projection extending from the side surface of each of the riser bodies, the projection sized and shaped to selectively connect the riser to the existing steering structure of the vehicle utilizing the clamp members of the steering structure, and allow for selective eccentric rotation of the riser about a second axis to allow for height and position adjustment of the handlebar in relation to the vehicle.

* * * * *